United States Patent [19]

Rocksvold

[11] 4,239,251
[45] Dec. 16, 1980

[54] COMPENSATING HITCH

[75] Inventor: Alvin N. Rocksvold, Woodland, Calif.

[73] Assignee: Marvin Landplane, Woodland, Calif.

[21] Appl. No.: 60,865

[22] Filed: Jul. 26, 1979

[51] Int. Cl.³ .............................................. B60D 1/00
[52] U.S. Cl. ............................. 280/446 A; 172/274; 172/459; 280/460 A
[58] Field of Search .......... 280/446 R, 446 A, 460 R, 280/460 A, 461 R, 461 A, 456 R, 456 A; 172/459, 450, 779, 274, 272

[56] References Cited

U.S. PATENT DOCUMENTS

| | | |
|---|---|---|
| 3,032,903 | 5/1962 | Ede . |
| 3,106,254 | 10/1963 | Clark .............................. 280/461 A |
| 3,255,828 | 6/1966 | Abbott . |
| 3,435,902 | 4/1969 | Folkerts . |
| 4,019,754 | 4/1977 | Hinckley ........................ 280/456 R |
| 4,106,794 | 8/1978 | Sallis .............................. 280/456 R |
| 4,119,166 | 10/1978 | Ayotte ............................ 280/446 B |

*Primary Examiner*—John P. Silverstrim
*Attorney, Agent, or Firm*—Roger B. Webster

[57] ABSTRACT

A compensating hitch adapted to be coupled between a three-point draft system at the rear end of a wheeled tractor and the front end of a trailing earthworking implement which is wheel supported rearwardly of an earthworking blade thereof; the hitch including a link and lever array which functions to maintain the implement and its earthworking blade in a constant pre-set working position when the tractor traverses uneven ground, and which—with a conventional hitch—would cause the trailing implement and its blade to undesirably vary up and down from such constant pre-set working position.

8 Claims, 4 Drawing Figures

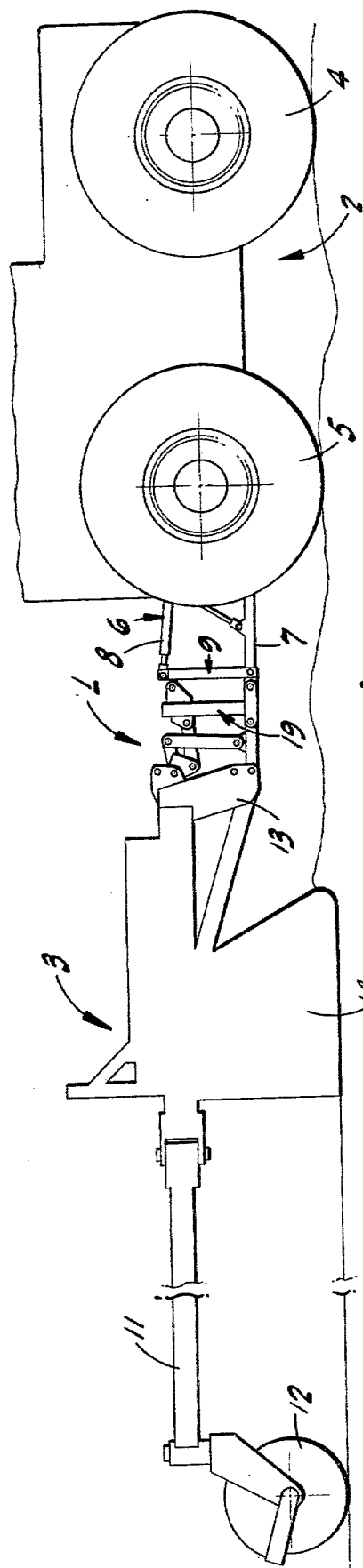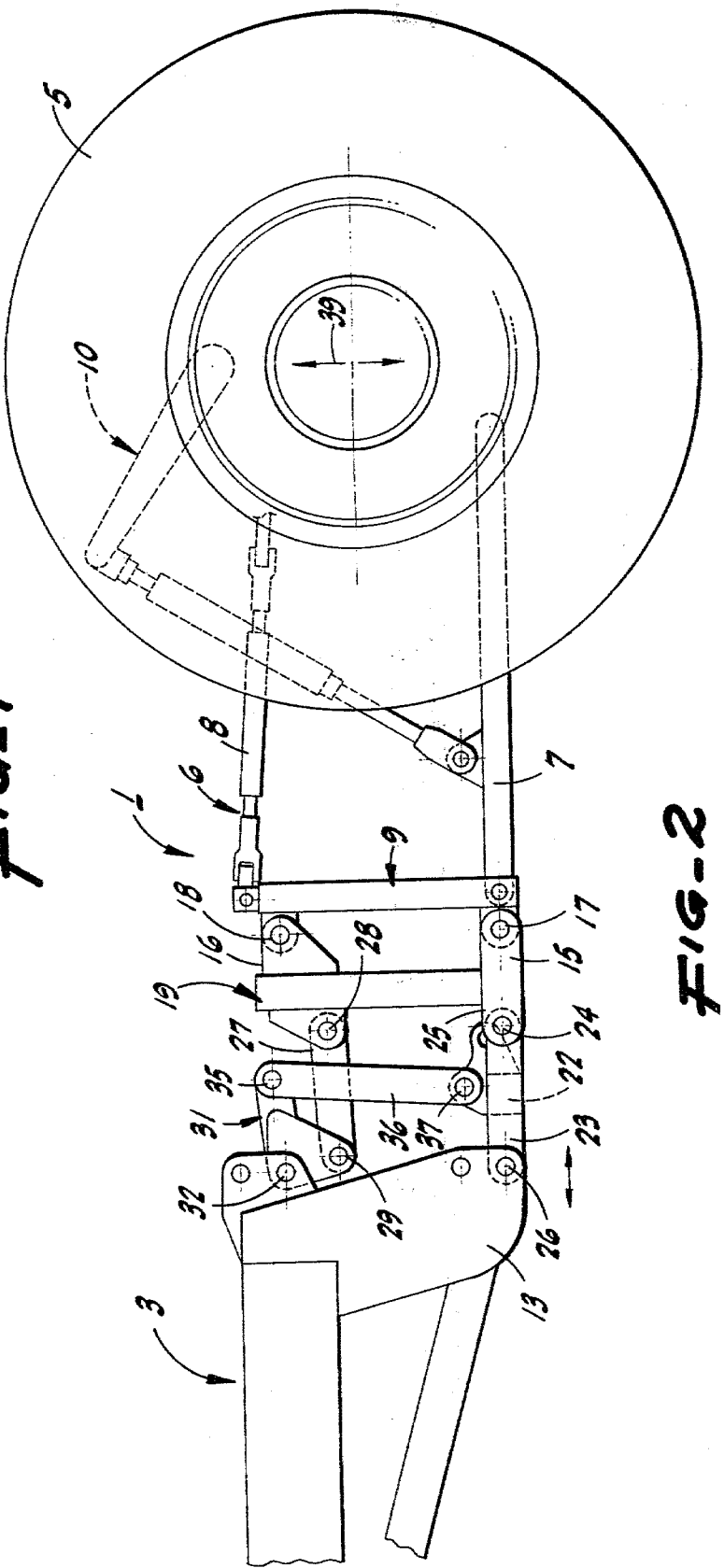

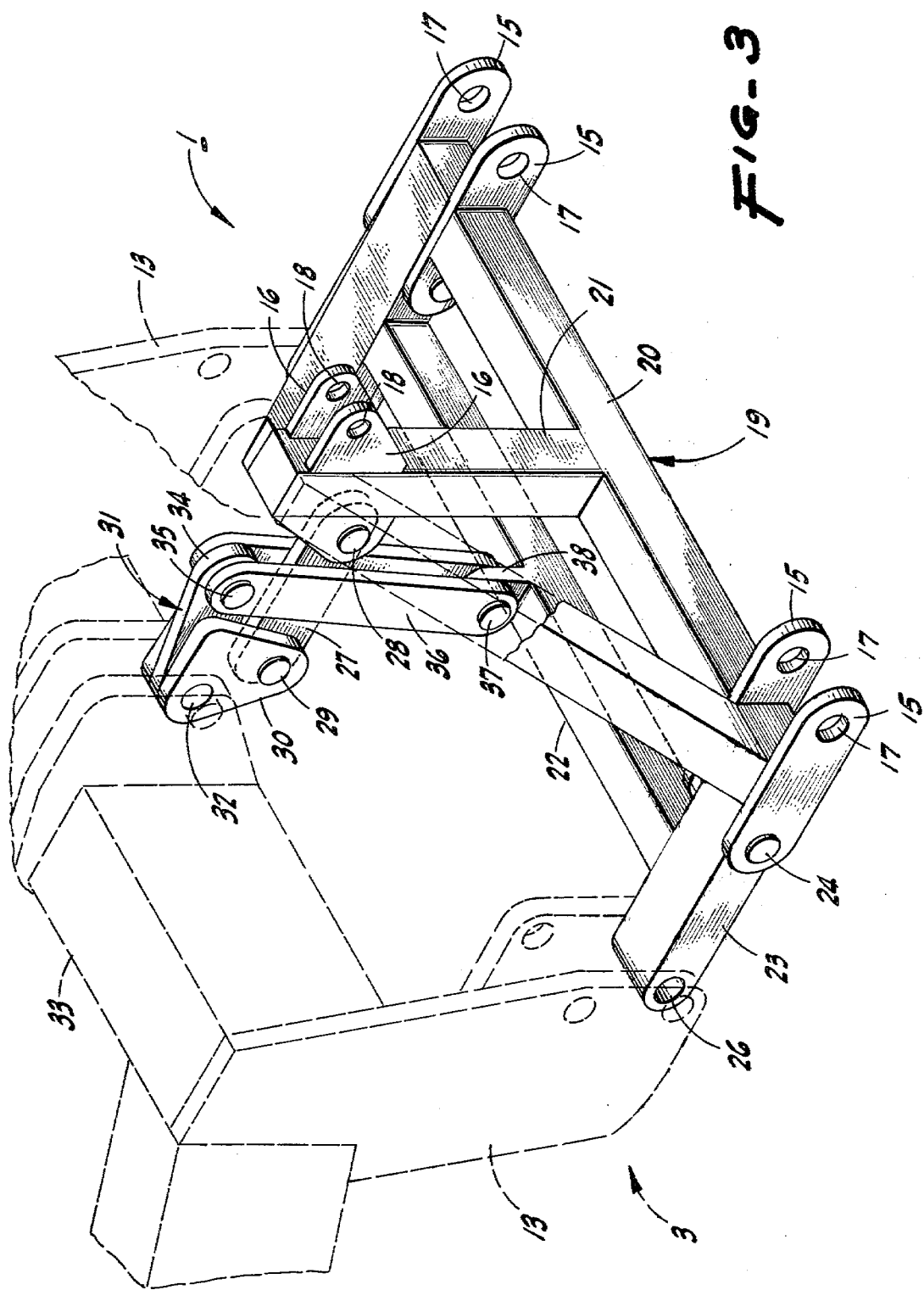

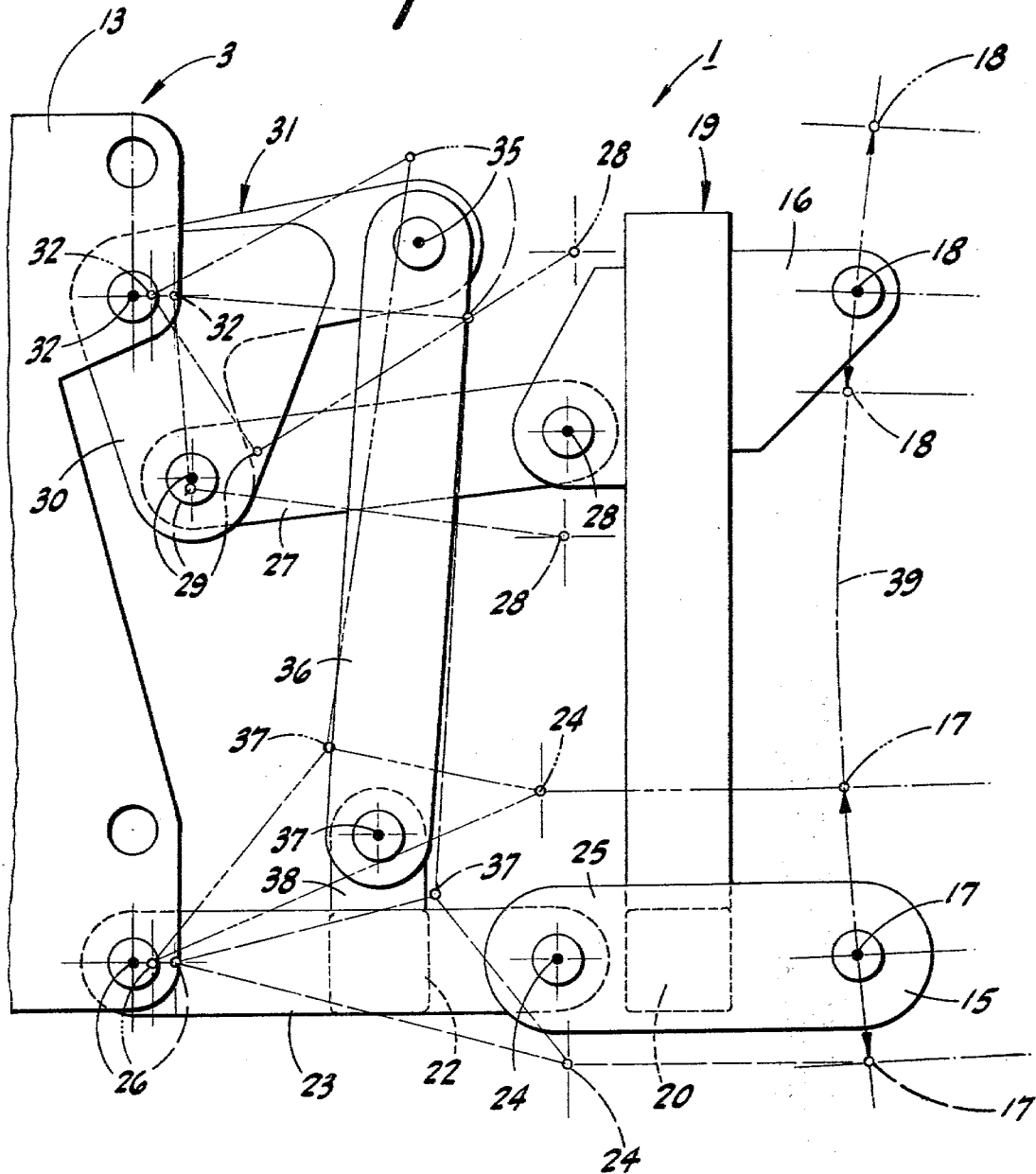

COMPENSATING HITCH

BACKGROUND OF THE INVENTION

1. Field of the Invention

When a rear wheel-supported trailing earthworking implement—with an earthworking blade thereon—is conventionally hitched, at its front end, to a three-point draft system at the rear end of a wheeled tractor, the implement is undesirably raised at the front end when the front wheels of the tractor enter a depression or when the rear wheels of the tractor traverse a hump, and—conversely—the implement is undesirably lowered at the front end when the front wheels of the tractor traverse a hump or the rear wheels of the tractor enter a depression. Thus, any such vertical motion of the front end of the implement causes the earthworking blade to vary from the desired constant pre-set working position thereof. Compensating hitches for coupling between a tractor and a trailing implement are known in sundry forms, but in many instances such hitches are structurally deficient and frequently do not function with sufficient accuracy for practical use. The present invention was conceived in a successful effort to provide a compensating hitch which avoids any such objections.

2. The Prior Art

U.S. Pat. No. 3,032,903 is exemplary of the prior art known to applicant.

SUMMARY OF THE INVENTION

The present invention provides, as a major object, a structurally and functionally novel compensation hitch adapted to be coupled between a three-point draft system at the rear end of a wheeled tractor and the front end of a trailing earthworking implement which is wheel-supported rearwardly of an earthworking blade; the hitch—upon advance of the tractor and implement in a field—being operative to prevent the vertical undulation of the tractor (as it traverses uneven ground) and causing up and down variance of the implement and its earthworking blade from a constant pre-set working position.

The present invention provides, as another important object, a compensating hitch, as above, which includes a novel link and lever array employed in the accomplishment of the desired result as aforesaid.

The present invention provides, as a further object, a compensating hitch which is designed for ease and economy of manufacture, ready attachment, and long service with a minimum of maintenance.

The present invention provides, as a still further object, a practical, reliable, and durable compensating hitch, and one which is exceedingly effective for the purpose for which it is designed.

BRIEF DESCRIPTION OF THE DRAWINGS

FIG. 1 is a side elevation showing the compensating hitch coupled between a three-point draft system at the rear end of a wheeled tractor and the front end of a trailing earthworking implement.

FIG. 2 is a similar but enlarged view, partially broken away.

FIG. 3 is an enlarged isometric view of the compensating hitch detached from the tractor, but as coupled to the front end of the earthworking implement; the latter being shown only in part and in broken lines.

FIG. 4 is an enlarged side elevation of the compensating hitch as shown in FIG. 3. In this view, the normal positions of the parts of the compensating hitch are shown in full lines, while—dimensionally accentuated—the view diagrammatically illustrates in dash-dot lines the positions of the parts of the compensating hitch when the rear-end draft system of the tractor raises in an instance when the tractor traverses uneven ground, and in dash lines the positions of the parts of said hitch in an instance when the rear-end draft system of the tractor lowers as the tractor traverses uneven ground.

DESCRIPTION OF THE PREFERRED EMBODIMENT

Referring now more particularly to the drawings and to the characters of reference marked thereon, the compensating hitch, indicated generally at 1, is in use coupled between a wheeled tractor and a trailing earthworking implement, indicated generally at 2 and 3, respectively.

The tractor, which is conventional, includes front wheels 4, rear wheels 5, and—at the rear—a three-point draft system indicated generally at 6. Such three-point draft system 6—likewise conventional—includes transversely spaced, lower draft arms 7 and a central, upper draft arm 8; the draft arms 7 and 8—which project rearward from the body of the tractor—being connected at their rear ends to a transverse, upstanding frame 9 of A-frame configuration or the like. A conventional tractor-mounted power mechanism 10 is connected to lower draft arms 7 and functions to pre-set the position of the draft system 6.

The trailing earthworking implement 3 may be any one of sundry types, and—for the purpose of this specification—is here illustrated as a finish leveler which includes a longitudinal frame 11 supported at the rear by a rear wheel assembly 12, and provided at the front with transversely spaced, upstanding attachment plates 13; there being an earthworking blade unit 14 fixed on and depending from frame 11 intermediate its ends.

The compensating hitch 1 is connected, at the front, in corresponding three-point relation to the draft arms 7 and 8 through the medium of the upstanding frame 9; the connecting means on the hitch being a pair of transversely spaced lower clevises 15 and a central upper clevis 16 which project forward and are pivotally engaged, as at 17 and 18, respectively, with corresponding ears on the upstanding frame 9. In some draft installations, the upstanding frame 9 is not present in the draft assembly, and—in such instance—the lower draft arms 7 and the upper draft arm 8 are directly pivotally connected to the lower clevises 15 and the upper clevis 16, respectively.

The compensating hitch 1—which is connected at the rear to the attachment plates 13 of the implement in the manner as will hereinafter appear—comprises, at the front, an upstanding three-point A-type frame 19 which includes a horizontal front cross beam 20 and a central, vertical, laterally braced post 21 upstanding from said cross beam.

A rear cross beam 22 is disposed in spaced, parallel relation to the front cross beam and normally lies in substantially the same horizontal plane. The rear cross beam 22 has rigid, longitudinal end sections or arms 23 thereon in "T" relation, i.e., the rear cross beam is secured at its ends to the arms 23 centrally of the ends of the latter.

The transversely spaced arms 23 are pivoted at their front ends, as at 24, in clevises 25 which project rearward from the ends of the front cross beam 20, while said arms 23 are pivoted at their rear ends, as at 26, in connection with the corresponding attachment plates 13 of the implement.

A short, longitudinal link 27 is pivoted at its front end to the rear of the post 21 adjacent but short of the upper end thereof, as at 28, and said link 27 is pivoted at its rear end, as at 29, to the lower end of the rear, depending leg 30 of a bellcrank lever indicated generally at 31. The bellcrank lever 31 is pivoted at its elbow, as at 32, centrally to an upper cross beam 33 which spans, on the implement, between the attachment plates 13; the bellcrank lever having an upper, forwardly projecting leg 34 which extends toward but terminates short of the post 21.

At its front end, the upper leg 34 of the bellcrank lever is pivoted, as at 35, to the upper end of a depending link 36 which, in turn, is pivoted at its lower end, as at 37, to an ear 38 upstanding from the rear cross beam 22 centrally of the ends of the latter.

The compensating hitch 1, constructed as described, and when coupled between a wheeled tractor 2 and a trailing earthworking implement 3 (with three-point connection to both), is operative to produce the following results:

When the tractor 2 is travelling on even ground, and hence in a straight draft line, the three-point draft system 6 of the tractor remains in a vertically fixed position and with the parts of the compensating hitch then stationary and providing a "strong back" effect which holds the front end of the implement 3 and its earthworking blade unit 14 in a constant pre-set working position.

However, when the front wheels of the tractor enter a depression or the rear wheels traverse a hump, the three-point draft system 6 is raised above its normal straight draft line, and, conversely, when the front wheels of the tractor traverse a hump or the rear wheels enter a depression, said three-point draft system is lowered from its normal position. With conventional hitches, such occurrences result in a corresponding raising or lowering of the front end of the implement and the blade unit 14—this, undesirably, producing a lighter or heavier earth cut, as the case may be.

Such an undesirable result is prevented by the present compensating hitch 1, and which is operative to automatically translate or convert vertical movement of the three-point draft system b—to above or below its normal straight draft line position—into a very nominal forward movement of the front end of the implement and without altering the implement level and the pre-set working position of the blade unit 14.

More particularly, and by reference to FIG. 4 of the drawings, it will be observed that when the pivots 17 and 18 at the front of the compensating hitch 1 move upward (in response to the three-point hitch system 6 being raised above the normal straight draft line upon the tractor traversing uneven ground), such pivots 17 and 18—moving upward in the arcuate path indicated at 39—cause the frame 19 to likewise move upward, whereupon the described link and lever array of the hitch assumes the positions shown diagrammatically in dash-dot lines. This results—by conversion of motion—in the pivots 26 and 32 at the rear of the hitch moving directly forward a small distance but without change in vertical position relative to the ground. Consequently, the front end of the implement and blade unit 14 remain in the desired constant pre-set working position.

Likewise, the pivots 26 and 32 only shift forward, and the front end of the implement and the blade unit 14 remain in the desired pre-set position, when the pivots 17 and 18 move downward, in arcuate path 39, in response to the three-point hitch system being lowered below the normal straight draft line upon the tractor traversing uneven ground; the positions, in this instance, of the link and lever array of the hitch being shown in dash lines in FIG. 4.

Thus, irrespective of the undulations of the tractor as it moves over uneven ground, and the resultant movement of the three-point draft system 6 up or down relative to a normal straight draft line, the compensating hitch converts such up or down movement to a nominal forward movement and without varying the level of the implement whereby to hold constant the pre-set working position of the blade unit.

While, for the purpose of example, reference is made herein to a "blade unit", it is to be understood that such part may be another type of earthworking tool. Similarly, while the tractor is here disclosed as of wheeled type, the compensating hitch of the present invention may be successfully employed with any tractor having, at the rear, a three-point draft system to provide compatibility with the hitch.

From the foregoing description, it will be readily seen that there has been produced such a compensating hitch as substantially fulfills the objects of the invention, as set forth herein.

While this specification sets forth in detail the present and preferred construction of the compensating hitch, still in practice such deviations from such detail may be resorted to as do not form a departure from the spirit of the invention as defined by the appended claims.

I claim:

1. A compensating hitch adapted for coupling between a three-point draft system at the rear end of a tractor and the front end of a trailing earthworking implement in three-point draft relation to the latter; said compensating hitch comprising an upstanding front frame including a front cross beam and a central post upstanding therefrom, means to connect said front frame with the three-point draft system of the tractor, a rear cross beam in spaced parallel relation to the front cross beam, rigid longitudinal arms on and projecting forward from the ends of the rear cross beam, means transversely pivoting the longitudinal arms at their front ends in connection with the corresponding ends of the front cross beam, a central link upstanding above the rear cross beam, means transversely pivoting the link at its lower end in connection with the rear cross beam, a bellcrank lever disposed rearward of the upper portion of the upstanding central link, the bellcrank lever incuding an upper forwardly projecting leg and a rear depending leg, means transversely pivoting the upper end of the link in connection with the front end of the upper forwardly projecting leg of the bellcrank lever, a separate link extending longitudinally between the bellcrank lever and the post in adjacent but clearance relation to the upstanding central link, means transversely pivoting said separate link at the front end in connection with the post and at the rear end with the lower end of the rear depending leg of the bellcrank lever, and means to connect the ends of the rear cross beam, and the bellcrank lever at its elbow, to the front end of the implement in three-point draft relation.

2. A compensating hitch, as in claim 1, in which said rigid longitudinal arms include portions which project rearward from the ends of the rear cross beam; and said last named means includes transverse pivots adapted to connect the rear ends of said arm portions and the implement and another transverse pivot adapted to connect the elbow of the bellcrank lever and the implement.

3. A compensating hitch, as in claim 1, in which the post is diagonally braced from the top to the outer ends of the front cross beam whereby the front frame is of generally "A" frame configuration.

4. A compensating hitch, as in claim 1, in which the means to connect the front frame to said three-point draft system of the tractor includes a forwardly opening clevis on each end of the front cross beam, and a forwardly opening clevis on the upper end of the post.

5. A compensating hitch, as in claim 1, in which the means transversely pivoting the longitudinal arms at their front ends with corresponding ends of the front cross beam includes a rearwardly opening, arm-receiving clevis at each end of said front cross beam.

6. A compensating hitch adapted for coupling between a three-point draft system at the rear end of a tractor and the front end of a trailing earthworking implement in three-point draft relation to the latter; said compensating hitch comprising an upstanding front frame including a front cross beam and a central post upstanding therefrom, means to connect said front frame with the three-point draft system of the tractor, a rear cross beam in spaced parallel relation to the front cross beam, rigid longitudinal arms fixed intermediate their ends on corresponding ends of the rear cross beam, means transversely pivoting the longitudinal arms at their front ends in connection with corresponding ends of the front cross beam, a central link upstanding above the rear cross beam, means transversely pivoting the link at its lower end in connection with the rear cross beam, a bellcrank lever disposed rearward of the upper portion of the upstanding central link, the bellcrank lever including an upper forwardly projecting leg and a rear depending leg, means transversely pivoting the upper end of the link in connection with the front end of the upper forwardly projecting leg of the bellcrank lever, a separate link extending longitudinally between the bellcrank lever and the post in adjacent but clearance relation to the upstanding central link, means transversely pivoting said separate link at the front end in connection with the post and at the rear end with the lower end of the rear depending leg of the bellcrank lever, and means to connect the rear ends of said longitudinal arms, and the bellcrank lever at its elbow, with the front end of the implement in three-point draft relation.

7. A compensating hitch, as in claim 6, for an implement having, at its front end, transversely spaced attachment plates and an upper cross beam spanning between said attachment plates; and said last named means being transverse pivots, certain of which connect the rear ends of the longitudinal arms with corresponding attachment plates, and another of which pivots connects the elbow of the bellcrank lever with said upper cross beam.

8. A compensating hitch, as in claim 6, wherein the longitudinal arms are fixed substantially centrally of their ends on the corresponding ends of the rear cross beam.

* * * * *